M. C. BRIGHT.
FUEL CONTROL SYSTEM FOR EXPLOSION ENGINES.
APPLICATION FILED JUNE 30, 1919.

1,374,983.

Patented Apr. 19, 1921.

WITNESS:
D. W. Vorhies
F. M. Roeder INVENTOR:
Martin C. Bright,
BY
E. T. Silvius,
ATTORNEY.

UNITED STATES PATENT OFFICE.

MARTIN C. BRIGHT, OF INDIANAPOLIS, INDIANA.

FUEL-CONTROL SYSTEM FOR EXPLOSION-ENGINES.

1,374,983.   Specification of Letters Patent.   Patented Apr. 19, 1921.

Application filed June 30, 1919. Serial No. 307,730.

*To all whom it may concern:*

Be it known that I, MARTIN C. BRIGHT, a citizen of the United States, residing at Indianapolis, in the county of Marion and State of Indiana, have invented a new and useful Fuel-Control System for Explosion-Engines, of which the following is a specification, reference being had to the accompanying drawings and to the letters and figures of reference marked thereon.

This invention relates to a unitary device whereby to control the supply of fuel to an explosion engine in a simple manner, and whereby the fuel mixture may be made an anti-carbon medium or remedy for the trouble arising from the deposits of carbon in the explosion engine, the invention having reference more particularly to a fuel control system having a single primary controller.

An object of the invention is to provide a compact and reliable apparatus whereby to draw hydro-carbon from a reservoir by vacuum and promptly and automatically feed the hydro-carbon to a carbureter, an aim being to reduce to the minimum the pipe-line length and friction between the explosion engine cylinder and the vacuum tank with its feeding apparatus and also between the vacuum tank and the carbureter, to insure prompt action of the fuel-supplying system.

Another object is to provide a primary controller to be manually operated as conditions may indicate, and appliances adapted to automatically operate, when the explosion engine is in operation, under control of the primary controller to automatically supply explosive mixture to the explosion engine under varying operating conditions.

A further object is to provide means whereby to incorporate an element with the explosive mixture that shall be beneficial in eliminating or preventing carbon deposits in the explosion chamber of the engine and tend to remove carbon deposits, in order to eliminate a cause of inefficiency of the explosion engine.

A still further object is to provide means whereby to incorporate an oily medium with the explosive mixture to assist in eliminating trouble arising from carbon deposits and to so improve the character of the explosive mixture that it shall have a tendency to lubricate the cylinders and valves of the explosion engine.

A still further and particular object is to provide vacuum control and feeding apparatus which shall be so constructed as to be sensitive and reliable in operation to replenish the vacuum tank from the supply reservoir in response to the operating requirements.

A more particular object is to provide means in a carbureter whereby increase of fuel supply is automatically effected in response to accelerated feeding of the fuel to the carbureter, and under control of the primary controller.

With the above-mentioned and other objects in view, the invention consists in a unitary fuel control system having novel correlated features and adapted for performing the functions required in a novel manner; and further, the invention consists in the novel parts, and the combinations and arrangements of parts, as hereinafter particularly described and further defined in the accompanying claims.

Referring to the drawings.

Similar reference characters in the various figures of the drawings indicate corresponding elements or features of construction herein referred to in detail.

Figure 1:
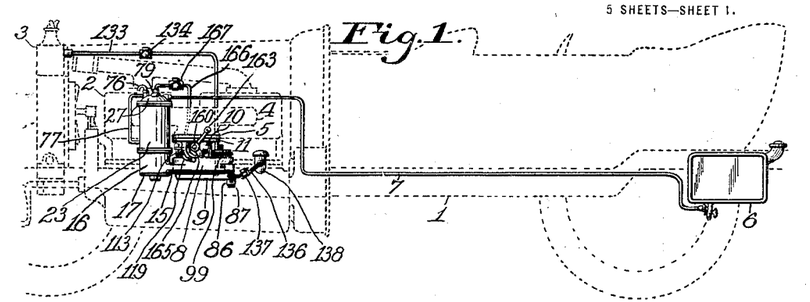
—Figure 1 is a side elevation of the new fuel control system arranged in connection with an automobile which is indicated in outline by broken lines.

In the drawings the numeral 1 indicates an automobile frame on which a water-cooled explosion engine 2 and a radiator 3 comprised in the cooling system are mounted, the explosion engine having an intake manifold 4 provided with a joint flange 5 whereby to connect a carbureter with the intake pipe of the manifold. At the rear portion of the automobile frame is a supply reservoir 6 from which extends a supply pipe 7 to conduct the required gasoline or other hydro-carbon to the vacuum tank comprised in the fuel control system.

Figure 5:
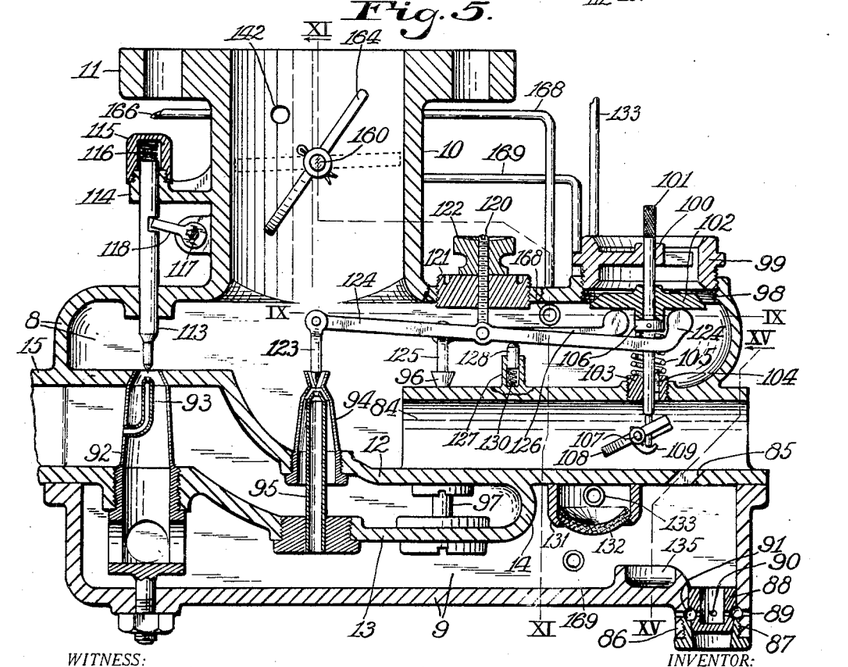
Fig. 5 is a vertical central section of the carbureter portion of the fuel control system.

The carbureter comprised in the fuel control system has a suitable hollow body portion preferably comprising a main part 8 and a removable bottom part 9, the main part having a mixing chamber and also a mixing tube 10 constituting a throttle box having a supporting flange or ears 11 which is secured to the flange 5 of the manifold, the bottom part 9 having an air-chamber from which to draw air to be carbureted. The body of the carbureter has a horizontal partition 12 which has a relatively low portion forming the bottom of the main part, and also a relatively lower partition 13 having an end portion 14 connected to the lower portion of the partition 12, a fuel chamber being formed between the two partitions and from which a neck 15 extends that is integral with the main part 8 to form an inlet to the fuel chamber. A reservoir body 16 is cast integrally with the neck and has a removable bottom 17 provided on its inside with a central socket 18. A suitable float 19 is arranged in the reservoir and is vertically guided on a guide rod 20 which is secured in the socket 18, the float having a central valve rod 21 projecting from its top and provided with a feed-valve 22 to control the admission of fuel to the reservoir.

Figures 2, 3:
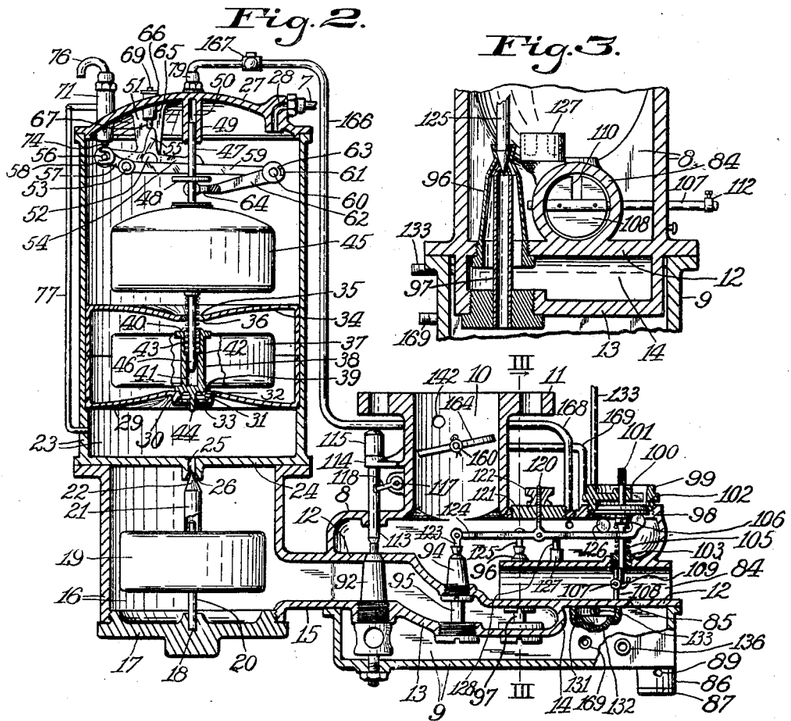
Fig. 2 is a vertical central section of the apparatus comprised in the fuel control system.
Fig. 3 is a fragmentary section approximately on the plane of the line III—III in Fig. 2.
Figure 4:
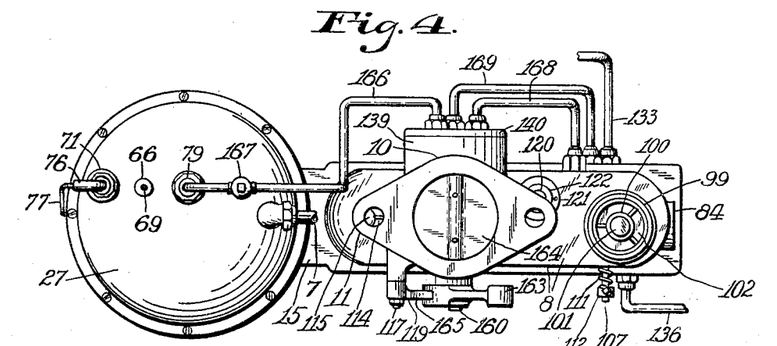
Fig. 4 is a top plan of the new apparatus.
Figures 6, 7, 8:
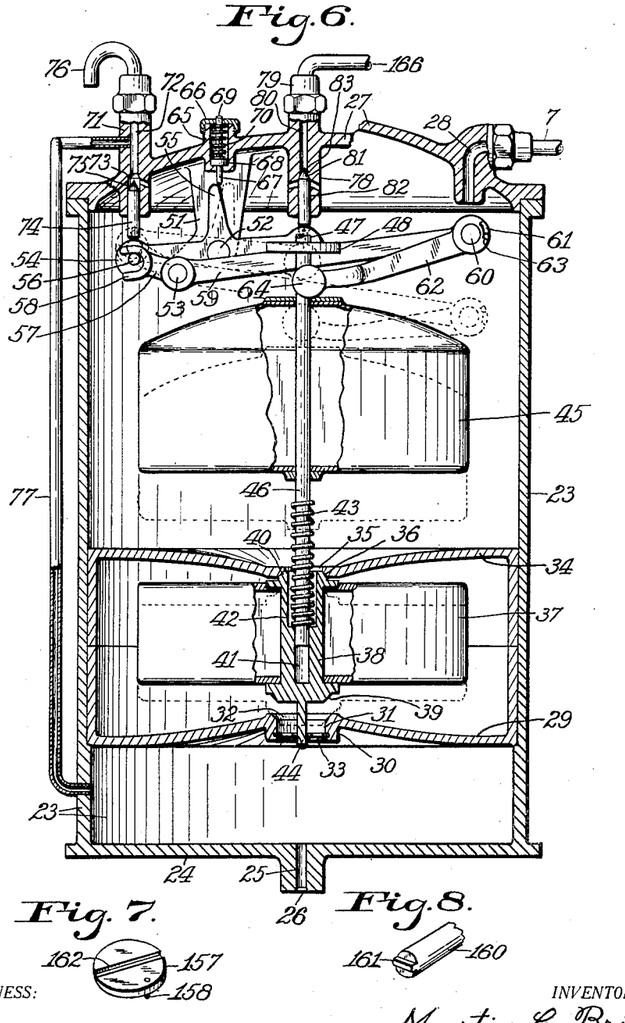
Fig. 6 is a vertical central section of the vacuum-feed apparatus comprised in the fuel control system.
Figs. 7 and 8 are perspective views of parts of the primary controller.
Figure 9:
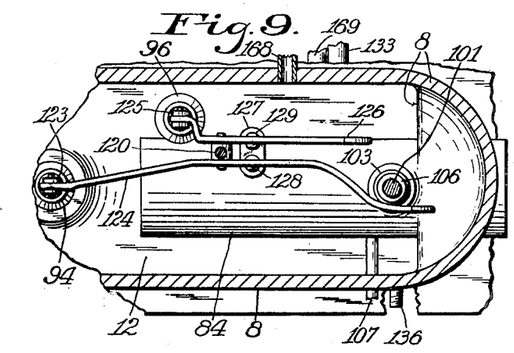
Fig. 9 is a fragmentary horizontal section approximately on the line IX—IX in Fig. 5.
Figure 10:
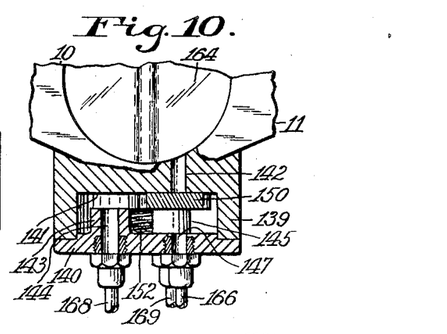
Fig. 10 is a fragmentary top plan of the carbureter and section on the line X—X in Fig. 12.
Figure 11:
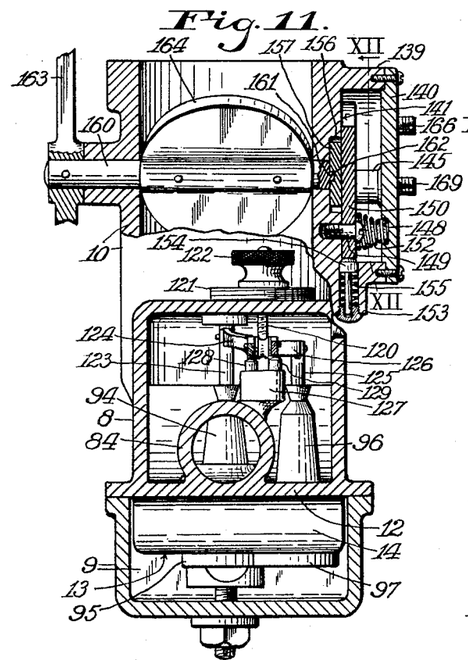
Fig. 11 is a sectional elevation approximately on the line XI—XI in Fig. 5.
Figure 12:
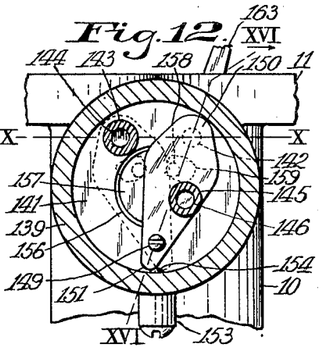
Fig. 12 is a fragmentary section approximately on the plane of the line XII—XII in Fig. 11.

The improved vacuum tank comprises a cylindrical wall 23 provided with a bottom 24 which is connected to the top of the reservoir body wall 16 to constitute a reservoir top or partition between the vacuum tank and the reservoir, the bottom 24 having a central aperture 25 at the lower end of which is a valve seat 26 adapted to be engaged by the valve 22 to close the aperture. The vacuum tank has a top part 27 which has an inlet duct 28 with which the supply pipe 7 is connected. A partition 29 is secured to the wall 23 at a suitable distance above the bottom 24 and has a central boss 30 through which a duct 31 extends, a valve seat 32 being provided at the upper end of the duct and a guide spider 33 in the lower portion of the duct. Another partition 34 is secured to the wall 23 at a suitable distance above the partition 29, and it has a central duct 35 therein at the lower end of which is a valve seat 36. The partitions 29 and 34 form a feed control chamber in which a float 37 is arranged which is provided with a central core 38 having a valve portion 39 at its lower end adapted to operate on the valve seat 32, the upper end of the core having a valve portion 40 adapted to operate on the valve seat 36. The core has a vertical central guideway 41 and also a counterbore 42 extending downward from the upper end of the core to receive a coil spring 43 which is seated on the bottom of the counterbore and extends upward through the duct 35. The core has also a guide stem 44 on its lower end that extends through the spider 33. When the feed control chamber is partially filled with the fuel the float rises and opens the duct 31 after which it closes the duct 35 in case the fuel is not drawn out of the chamber below the partition 29. Another float 45, preferably a relatively larger one is arranged in the vacuum chamber or space above the upper partition 34 and has a stem 46 secured thereto and extending downward through the duct 35 and the spring 43 and into the guideway 41, the float having also a stem 47 extending upward therefrom, said stem preferably being composed of a rod extending through the float, and the stem 47 has a stop collar 48 thereon at a suitable distance above the float. The top 27 has a central stud 49 on its under side in which is a guideway 50 receiving the upper portion of the stem 47. The upper float may rise with the increasing volume of fuel so as to leave the spring 43, or as the volume of fuel decreases in use it may descend and engage the spring and assist in pushing down and yieldingly holding the lower float with the valve 39 on its seat, an action which is desirable in case the vacuum in the uppermost chamber tends to hold the valve 40 to the seat 36.

The under side of the top 27 has a hanger 51 rigid thereon which is provided with a pivot 52 and another pivot 53 at a suitable distance from the pivot 52. A tumbling lever 54 is mounted between its ends on the pivot 52 and has a finger 55 on its middle portion, and it has also a stud 56 on one side thereof. A controlling lever is provided which is mounted on the pivot 53 and has a short arm 57 that has a fork 58 loosely embracing the stud 56 so as to engage the stud after slight movement of the arm, the lever having a relatively longer arm 59 which has a pivot 60 and a lug device 61 beyond one side of the pivot. The arm 59 is arranged above the float 45 as is also the tumbling lever, and a return arm 62 is connected to the pivot 60 and has a slot 63 receiving the lug device 61 and permitting slight pivotal movement of the arm before engaging the lug device, the arm 62 having a fork 64 straddling the stem 47 between the float 45 and the collar 48, there being sufficient space to permit movement of the float in one direction without moving the arm 62. The top 27 has a casing 65 having a removable top 66 and a bolt 67 is movably guided on the bottom of the casing and has a stop collar 68 normally resting on said bottom, the bolt having a guide stem 69 that is guided on the top 66; and a spring 70 is arranged in the casing in engagement with the stop collar and the top of the casing to yieldingly force the bolt into contact with the finger 55, the bolt 67 normally engaging either one or the opposite side of the finger adjacent to its end, to hold the tumbler lever 54 in the position in which it may be set. The top 27 has also a valve box 71 thereon which has a vent duct 72 extending therethrough and in the lower portion of which is a downwardly facing valve seat 73, the duct below the valve seat appropriately guiding a valve body 74 that extends to the tumbler lever 54 adjacent to the stud 56, the valve body having a valve 75 at its upper end to operate on the valve seat 73. The duct 72 has a suitable outer end terminal 76 open to the atmosphere and preferably adapted to exclude dust. A vent pipe 77 is connected with the chamber in the vacuum tank below the lower partition 29 and preferably is connected with the duct 72. The top 27 is provided also with a valve box 78 provided outside the top 27 with a suitable pipe connection 79, the box having a duct 80 therein having a downwardly facing valve seat 81, the box below the valve seat appropriately guiding a valve body 82 that extends to the tumbler lever adjacent to the end thereof opposite to that which has the stud 56 and may be suitably connected to enable the tumbler lever to draw the valve body downward, the valve body having a valve 83 at its upper end adapted to operate on the valve seat 81 to control the flow of air to create vacuum in the tank, for the purpose of drawing the fuel into the vacuum tank. As will be seen, the devices for operating and controlling the vacuum-valve 81 and the vent-valve 73 are such as to enable the float 45 when rising to close the vacuum-valve and to permit the opening of the vent-valve, and to close the vent-valve and open the vacuum-valve when the float is descending.

In the construction of the carbureter part of the apparatus a suitable inlet is provided for atmospheric air to enter the chambers and preferably comprises a horizontal tube 84 that is integral with the lower portion of the bottom or partition 12 and extends through the adjacent end of the body part 8, to admit atmospheric air into the mixing chamber and the partition 12 has an inlet aperture 85 therein to conduct air from the tube to the lower air chamber. In order to admit more air into the air chamber than can pass through the aperture 85 a controlled air-inlet is provided which comprises a hollow valve box 86 having a conical valve seat member 87 therein on which an inverted cup valve 88 is arranged, the valve box having inlet apertures 89 above the member 87 to ports 90 in the wall of the valve, a passage 91 being provided around the valve for the free flow of the air to a limited extent when the valve is closed, a relatively larger volume of air being admitted past the valve when it is open as a result of increased suction in the air chamber.

For the purpose of admitting and controlling the admission of air and atomized fuel into the mixing chamber of the carbureter part of the system a nozzle 92 is inserted in the partition 13 and extends through the partition 12 at the higher portions thereof, to receive air from the chamber below the lower partition and conduct it through the upper partition, and a fuel-tube 93 is connected with the wall of the nozzle and extends upward nearly to the upper end thereof to conduct the fuel from the fuel-chamber to be drawn into the mixing chamber as needed. Another nozzle 94 is connected to and extends through the upper partition 12 to receive the fuel, an air-tube 95 being connected to the lower partition 13 and extending upward into the nozzle. Another nozzle 96 is connected also with the partition 12, an air-tube 97 being connected to the partition 13 and extending upward into the nozzle. The upper ends of the feed-tube 93 and the nozzles 94 and 96 and also the air-tubes 95 and 97 are adapted to be closed by suitable valves to be automatically opened more or less as may be required in operation.

In order to admit more air as the speed of the engine increases, the top of the body part 8 has an opening 98 therein in which a valve seat ring 99 is secured that is provided with a spider guide 100 in which a valve stem 101 is slidingly guided and permitted to rotate. A valve 102 is suitably arranged on the stem 101 to operate on the valve seat ring, the valve preferably being rotatable relatively to the stem. A spring-seat 103 is screwed through the upper portion of the tube 84 below the valve 102 so as to be adjustable relatively to the valve, and it guides the valve stem 101 which is provided with a spline 104 by which the stem may rotate and thereby adjust the spring-seat 103. A coil spring 105 is seated upon the spring-seat and extends about the stem so as to yieldingly force the valve 102 to its seat, the spring preferably engaging a collar 106 secured to the stem in contact with the under side of the valve. The valve may be drawn open with increasing suction in the mixing chamber to admit additional air to be carbureted, the degree of movement of the valve being regulated by the tension of the spring 105. In order to admit atmospheric air under control through the tube 84 to the lower portion of the mixing chamber in the vicinity of the nozzle 94 and insure thorough mixing in the mixing chamber, a shaft 107 is rotatably mounted horizontally in the wall of the tube 84 and has a "butterfly" valve 108 secured thereto that has a finger 109 on one side thereof to operate the valve, the valve having a slot 110 in its upper portion to clear the stem 101 which engages the finger, so that when the valve 102 is drawn open and pushes the stem downward the stem tilts and opens the valve 108 more or less according to the movement of the stem. The valve 108 is returned to closed position by means of a spring 111 on the shaft 107, one end of the spring being anchored to the body part 8 and the opposite end of the spring connected to a collar 112 adjustably secured to the shaft.

A valve 113 is slidingly arranged in the top portion of the part 8 and extends through a guide 114 supported by the mixing tube 10, the valve being adapted to operate in connection with the upper end of the feed-tube 93. The guide 114 is provided with a cap 115 in which a spring 116 is seated that engages the valve 113 to push it to the tube 93. A shaft 117 is rotatably supported also by the tube 10 and has a finger 118 secured thereto that is suitably connected with the valve 113 so as to move the valve to open position, the shaft being provided with a controlling arm 119 which, as will be further explained is automatically controlled.

A hanger rod 120 is adjustably mounted in the top portion of the main part 8, preferably by means of a bushing 121 screwed into place so as to be adjustable, and a locknut 122. A valve 123 is properly arranged and adapted to operate to close the nozzle 94 and the air-tube 95 and it is pivoted to a lever 124 that is pivotally supported between its ends on the rod 120, the lever extending to the under side of the valve 102, so that when the valve 102 is drawn down from its seat the valve 123 is moved to open position. A valve 125 is arranged to operate to close the nozzle 96 and the air-tube 97 and it is pivotally connected to a lever 126 which is pivotally supported between its ends by the rod 120 and extends to a point below the valve 102 so that after the valve moves downward it shall come into contact with and move the lever 126 to open the valve 125. Suitable means is provided for closing the valves 123 and 125 as the valve 102 moves to closed position and may comprise a box 127 supported on the tube 84 and movably guiding two push bars 128 and 129 that are forced by means of springs 130 into contact with the levers 124 and 126 respectively to force the valves 123 and 125 downward.

For the purpose of supplying the desired moisture from steam or warm water a box 131 is supported in the air-chamber below the partition 12 and it has a bottom 132 composed of suitable fibrous substance or felt of suitable material, and a conduit 133 is arranged in connection with the box and extends into connection with the upper portion of the radiator 3 and may be provided with a check valve 134.

For the purpose of supplying the desired oil or oily vapor a basin 135 is provided upon the bottom of the part 9 and a conduit 136 is extended thereto and preferably provided with a check valve 137, the conduit having suitable connection with the crank case of the explosion engine, preferably through a suitable "breather" device 138, so that the suction or partial vacuum in the air-chamber shall draw the oily vapor or fluid into the air-chamber to become mixed with the air passing therethrough to the nozzle 92.

Figure 13:
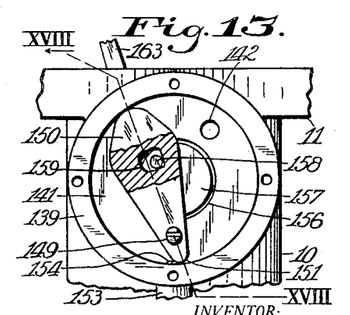
Fig. 13 is a front elevation of the valve chest minus its cover and the valve comprised in the primary controller.
Figure 14:
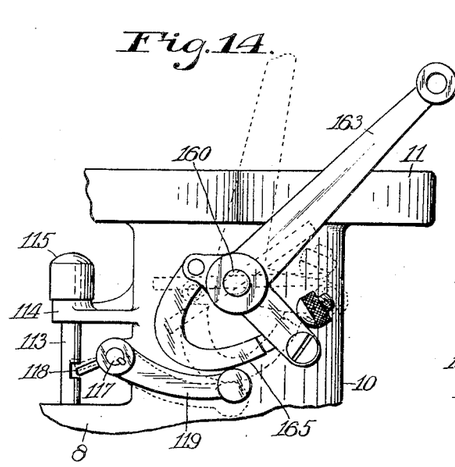
Fig. 14 is a fragmentary elevation of the mixing tube and features of the primary controller.
Figure 15:
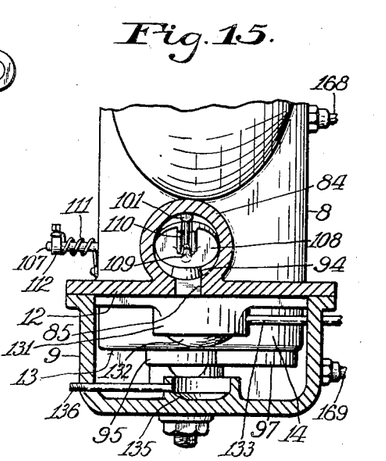
Fig. 15 is a fragmentary sectional elevation approximately on the line XV—XV in Fig. 5.
Figure 16:
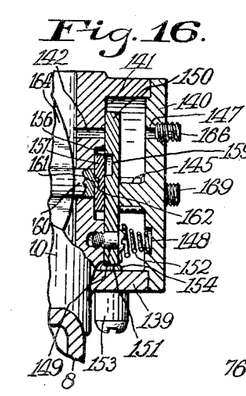
Fig. 16 is a fragmentary section approximately on the plane of the line XVI—XVI in Fig. 12.
Figure 17:
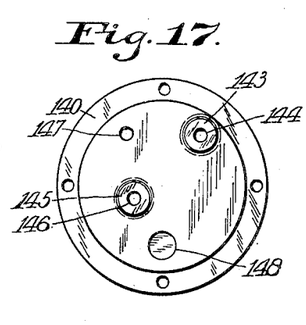
Fig. 17 is a plan of the inner side of the cover of the valve chest.
Figure 18:
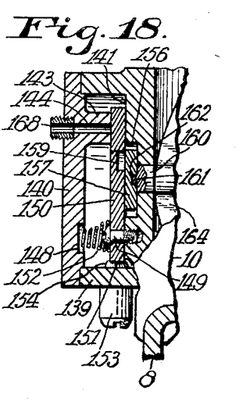
Fig. 18 is a fragmentary section approximately on the line XVIII—XVIII in Fig. 13; and, Fig. 19 is a fragmentary section of the vacuum tank and parts of the feeding apparatus slightly modified.

In the construction of the primary controller a valve chest 139 is provided on the outside of the mixing tube 10 and it includes a removable cover 140 and has a bottom 141 that is adapted to constitute a valve seat from which a port 142 extends to the interior of the mixing tube or throttle box 10. The inner side of the cover has a projection 143 and a port 144 extending through the cover and the projection, the projection being spaced a suitable distance from the port 142. The inner side of the cover has also another projection 145 and it has also a port 146 extending through the cover and projection, the projection being arranged near the middle of the cover. Opposite to the port 142 or in a convenient adjacent position the cover has also a duct 147 and, adjacent to the lower portion of the cover it has a socket 148 in its inner side. The bottom of the valve chest is provided opposite to the socket 148 with a pivot 149 on which a suitable plate valve 150 is mounted adjacent to one end thereof which has a rounded end face 151. A spring 152 is seated in the socket 148 and engages the valve to hold it to its seat, the valve being adapted to be moved either to close the ports 142 and 146 or over to close the port 144. A boxing 153 is connected with the lower portion of the valve chest and has a plunger 154 therein that is yieldingly forced into contact with the end face 151 by means of a spring 155 in the boxing, the plunger being adapted to hold the valve in either one of its two operating positions and to assist in bringing it to such positions after having been moved nearly thereto. The bottom 141 has a recess 156 therein in which a disk 157 is rotatively arranged and provided with a crank pin 158 that extends into a recess 159 in the back of the valve 150 for moving the valve to or fro on its pivot. A shaft 160 is rotatively mounted in the wall of the valve box 10 and extends to the recess 156, and the end of the shaft is provided with a transverse key bar 161 that extends into a groove 162 in the back of the disk 157, to enable the shaft to rotate the disk. A primary controlling lever 163 is secured to the outer end portion of the shaft 160, and a throttle valve 164 is arranged within the throttle valve box or mixing tube 10 and secured to the shaft 160. The lever 163 is provided with a suitable cam device 165 which preferably is adjustable and engages the arm 119 so as to automatically control the valve 113 in synchronism with the throttle valve 164 and the controller valve 150.

In order to maintain an efficient degree of vacuum in the vacuum-tank to insure prompt and continuous supply of fuel a short pipe 166 is connected with the duct 147 and also with the connection 79 to afford communication with the duct 80, the pipe preferably being provided with a check valve 167 to prevent flow toward the vacuum-tank. When the engine is running at low speed with the throttle valve 164 only slightly open the suction occurs through the port 142; but when the valve is further opened to obtain high speed the suction force at the port is reduced but is increased through the mixing chamber, and therefore a branch pipe duct 168 is connected with the wall of the part 8 in proximity to the valve 102 and is connected also with the port 144 which is opened when the throttle valve is opened to considerable extent, so that the vacuum is then created by suction through the valve chest and the port 144 and the duct 147, the valve 150 closing the port 142.

A pipe 169 is connected to the lower part 9 and also with the port 146 so as to conduct air and anti-carbonizing substance therewith from the constant-supply air chamber to the controller valve chest.

Figure 19:
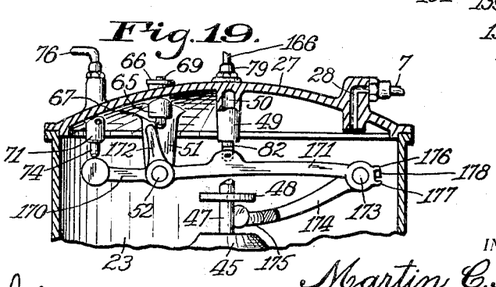

In a slightly modified form of construction of the vacuum feed apparatus, as shown in Fig. 19, the short tumbling lever is omitted and a long lever is supported between its ends on the pivot 52 so as to have a short arm 170 in engagement with the vent valve body 74 and a relatively long arm 171 extending over past the valve body 82 for control thereof with a suitable connection therewith, the lever having a finger 172 that is engaged by the bolt 67 whereby to hold the lever when tilted in either direction. The arm 171 is provided with a pivot 173 to which a return arm 174 is connected that has a fork 175 straddling the stem 47 between the float 45 and the collar 48. The arm 171 has lugs 176 and 177 spaced apart and the arm 174 has a lug 178 arranged between the other lugs, so that the arm 174 may be slightly moved pivotally and subsequently move the arm 171.

In practical use the explosion engine may be started and caused to operate in a well known manner or as may be designed, an initial supply of fuel being in the reservoir 16. The engine being in operation with the throttle valve 164 admitting sufficient mixture to the engine for slow speed the fuel is drawn through the nozzle or tube 92 from the tube 93 into the mixing chamber and thence past the throttle valve, the suction being strong through the port 142 which is uncovered, resulting in strong suction and the formation of vacuum in the upper chamber of the vacuum tank, resulting in drawing the fuel up from the main tank 6 and through the duct 28 into the upper chamber, the vent valve 75 at the same time being closed and the valve 81 open while the float 45 and operating connections are relatively low as indicated by broken lines in Fig. 6, and as appears in Fig. 2, so that the float 45 rests on the spring 43 and yieldingly holds the valve 39 to its seat. When the upper chamber in the vacuum tank becomes partially filled and the fuel passing through the aperture 35 partially fills the middle chamber in the tank the float 37 rises and closes the aperture 35 by means of the valve 40, after which the increasing volume of fuel in the upper chamber causes the float 45 to rise and through the operating devices cause the valve 81 to be closed and the valve 75 to be opened, thus temporarily stopping the inflow of fuel to the tank. The vent pipe 77 affords vent to permit the fuel to flow from the lower compartment into the reservoir 16 under control by the valve 22, the loss in the lower chamber being supplied through the duct 31 from the middle chamber until the descent of the float 37 closes the duct and opens the duct 35 to receive fuel from the upper chamber in which the float 45 then descends and causes a repetition of the operation of refilling the vacuum tank.

When the controlling arm 163 is operated to open the throttle valve 164 increased suction occurs to supply more fuel for higher speed, and as the suction increases the valve 102 is drawn open and causes the valve 123 to be opened so that a greater volume of explosive mixture is supplied automatically, and the supply is increased through the subsequent movement of the lever 126 as the valve 102 is further opened whereby the valve 125 is opened, and the auxiliary air valve 108 admits additional air to be carbureted. Therefore all the various functions of the system are automatically performed and the results thereof occur as a result of the operation of the primary controller, including the controlling valve 150 and the remaining operating elements of the apparatus, which will be clearly understood by reference to the preceding description of the details of construction and functions of the various features or parts of the apparatus, without further description in detail.

Having thus described the invention, what is claimed as new is—

1. An explosion engine fuel-control system including a vacuum tank having two connected chambers therein arranged one above the other, and two floats movable in the chambers respectively and coöperating each with the other to control admission of liquid from the upper to the lower one of the two chambers.

2. An explosion engine fuel-control system including a vacuum tank having three connected chambers therein arranged one above another, and two floats movable in the two upper ones of the chambers respectively and coöperating each with the other to control admission of liquid from the middle one to the lower one of the three chambers.

3. An explosion engine fuel-control system including a vacuum tank having three chambers therein arranged one above another, and two floats movable in the two upper ones of the chambers respectively and coöperating each with the other to control admission of liquid from the upper one to the middle one and from the middle one to the lower one of the three chambers.

4. An explosion engine fuel-control system including a vacuum tank having three chambers therein arranged one below another, means including a float in the uppermost one of the chambers for controlling admission of liquid into the chamber, and a float in the middle one of the chambers provided with valves and coöperating with the float in the uppermost chamber to control admission of the liquid from the upper to the middle one and from the middle one to the lowermost one of the three chambers.

5. An explosion engine fuel-control system including a vacuum tank having two connected chambers therein arranged one above the other, two floats movable in the chambers respectively, the float in the lower one of the chambers being adapted to control the passage of liquid into and out of the lower chamber from the upper chamber, and a coil spring carried by the float in the lower chamber to be engaged by the other of the two floats.

6. An explosion engine fuel-control system including a vacuum tank having a plurality of connected chambers therein, a float in the uppermost one of the chambers, apparatus controlled by the float adapted for controlling vacuum to draw liquid into the uppermost chamber to actuate the float, and a second float in the next adjacent lower one of the chambers coöperating with the float in the uppermost chamber and having valves adapted to control flow of the liquid into and out of the lower chamber.

7. An explosion engine fuel-control system including a vacuum tank having two chambers therein arranged one above the other, a main float in the upper one of the chambers to control admission of liquid into the chamber, a second float in the lower one of the chambers provided with a valve adapted to control admission of the liquid from the upper to the lower one of the chambers, and means enabling the main float to coöperate with the second float to control the admission of the liquid to the lower one of the chambers.

8. An explosion engine fuel-control system including a vacuum tank to receive a liquid for fuel, the top of the tank having a vent-valve and a vacuum-valve and also a hanger, a tumbler lever pivoted between its ends to the hanger and having controlling connection with the vent-valve and the vacuum-valve, a controlling lever having operative connection with the tumbler lever, a spring-actuated device arranged to engage the tumbler lever and hold it in position, a return-arm connected to the controlling lever, and a float guided in the tank and movable to engage and move the return-arm.

9. An explosion engine fuel-control system including a vacuum tank, a carbureter connected with the tank, a primary controller for the carbureter including a throttle valve and a controlling valve having an operating lever for both valves, and a main vacuum-line conduit extending through the primary controller to the vacuum tank and having a branch extending from the carbureter to the primary controller to be connected with the main vacuum-line conduit by the controlling valve in synchronism with the throttle valve control.

10. An explosion engine fuel-control system including a vacuum tank having two partitions therein arranged one above the other, the lower one of the partitions having a valve seat on its upper side, the upper one of the partitions having a valve seat on its lower side, a float above the upper one of the partitions and having a guide stem, and a float movably guided between the partitions and guiding said stem and having a valve on its lower side to coöperate with the valve seat of the lower partition and a valve on its upper side to alternatively coöperate with the valve seat of the upper partition, the two floats coöperating to control the passage of liquid in the tank from above the upper partition and through the lower partition.

11. An explosion engine fuel-control system including a vacuum tank, a mixing tube provided on the outside thereof with a valve chest, the wall of the mixing tube having a port therein extending from the interior of the mixing tube to the interior of the valve chest, a suction conduit connected with the valve chest and the top of the vacuum tank, a shaft rotative in the wall of the mixing tube lower than said port and extending into the valve chest, a throttle valve in the mixing tube secured to the shaft, and a controlling valve in the valve chest and connected to the shaft to be moved thereby to close or to open said port.

12. In a fuel-control system for explosion engines, the combination of a vacuum tank having a vacuum-chamber provided with a fuel-inlet and having an outlet duct in its bottom, the top of the vacuum-chamber having a vacuum-valve and also a vent-valve and being provided with a hanger having two pivots, said top being provided also with a boxing and a central guide, a tumbler lever supported between its ends on one of said pivots and having a stud on one side and a finger on the top thereof, one portion of the tumbler lever controlling the vacuum-valve and the opposite portion controlling the vent-valve, a controlling lever supported between its ends on the other of said two pivots and having a fork loosely embracing said stud, one arm of the controlling lever being longer than its opposite arm and having a pintle adjacent to its end and a lug separate from the pintle, a return arm connected to said pintle and having a slot receiving said lug, the return arm having also a fork on its end, a push-bar in said boxing and spring-pressed into contact with said finger, a float in the vacuum-chamber and having a stem on its top movably guided by said central guide, said stem extending through said fork and having a collar thereon above the fork, and means having coöperative connection through said outlet duct with said float to control feeding of the fuel through said duct.

13. In a fuel-control system for explosion engines, the combination with a carbureter and a feed-reservoir connected with the carbureter, of a vacuum tank connected at its bottom with the feed-reservoir and having two partitions therein spaced apart one above the other, the lower one of the partitions having a duct therein and a valve seat at the upper portion of the duct, the upper one of the partitions having a duct therein and a valve seat at the lower portion of the duct, a guide spider secured in the duct in the lower partition, a float movable between the two partitions and having a core therein provided at its lower end with a valve to operate on the valve seat on the lower partition and a stem guided in said spider, the core being provided at its upper end also with a valve to operate on the valve seat on the upper partition, said core having a guideway extending downward therein from its upper end, the guideway having a counter-bore in its upper portion, a spring seated in said counterbore and extending through the duct in the upper partition, a main float movable in the vacuum tank above the upper partition and having a stem thereon extending downward through said spring and into said guideway, and means in the vacuum tank controlled by said main float to control admission of liquid fuel into the upper portion of said tank.

14. In a fuel-control system for explosion engines, the combination with a vacuum tank, of a carbureter having a mixing chamber and also a mixing tube provided on the outside thereof with a valve chest and a valve seat at the bottom of the chest, the wall of said tube having a vacuum port therein extending through said seat, said seat being provided with a pivot and also a recess, a shaft rotatable in the mixing tube on a plane below the vacuum port and extending into said recess, the shaft having a crank thereon in said recess, a plate valve connected to said pivot and having loose connection with said crank to be moved over or away from said port, a branch pipe connected with the mixing chamber in the carbureter and also with the valve chest and having a terminal port arranged to be closed by said valve when moved away from said vacuum port, a vacuum pipe connected with the vacuum tank and the valve chest, and a throttle valve in the mixing tube secured to said shaft and set approximately at closed position when said vacuum port is open.

15. In a fuel-control system for explosion engines, a vacuum tank comprising a side wall and a bottom and a top, said bottom having an outlet duct, said top being provided with a fuel-inlet duct and also a vacuum-valve and a vent-valve, two partitions spaced apart and secured to said wall above said bottom, said partitions having each a port extending therethrough, a feed-float movable between said partitions and having valves to alternatively close said ports, a main float movable above the upper one of said partitions and having means to coöperate with the feed-float to control the passage of the fuel through said ports, a vent pipe connected with said wall below the lower one of said partitions and extending upward outside the wall, and apparatus above the main float operatively connected with the vacuum-valve and the vent-valve and adapted to be controlled by the main float.

16. In a fuel-control system for explosion engines, the combination of a vacuum tank having a feed-chamber therein, the bottom of the feed-chamber having a duct therein and a valve seat at the upper portion of the duct and having also a guide spider at the lower portion of the duct, the top of the feed-chamber having a duct therein and a valve seat at the lower portion of the duct, a float movable in the feed-chamber and provided with a core having a valve and a stem on its lower end, said stem extending movably through said guide spider, the core having a guideway therein extending from its upper end and having also a valve on its upper end, and a guide rod extending through the top of the feed-chamber and into said guideway, the upper portion of the guide rod being guided above the feed-chamber.

17. In a fuel-control system for explosion engines, the combination of a vacuum tank, a carbureter, a main vacuum-line conduit connected with the vacuum tank, a branch conduit connected with one portion of the carbureter, and a primary controller including a movable throttle valve for the carbureter and means operating automatically in synchronism with the throttle valve and adapted to connect the branch conduit with said main conduit as the throttle valve opens and to disconnect the branch conduit and connect said main conduit with another portion of the carbureter as the throttle valve closes.

18. In a fuel-control system for explosion engines, the combination with an explosion engine and an intake pipe thereof, of a carbureter connected with the intake pipe, a vacuum tank connected with the carbureter, a throttle valve in the carbureter, a controlling device for the throttle valve, a main vacuum-line conduit connected with the vacuum tank and also with the carbureter above the throttle valve, a branch conduit connected with the carbureter below the throttle valve, and means for automatically making or breaking connection of the branch conduit with the main vacuum-line conduit synchronically with the control of the throttle valve.

19. In a fuel-control system for explosion engines, the combination with an explosion engine and an intake pipe thereof, of a carbureter connected with the intake pipe, a vacuum tank connected with the carbureter, a primary controller for the carbureter, a throttle valve operated with the controller, and a vacuum-line conduit connected with the vacuum tank and having variable connection through the carbureter with the intake pipe, the variable connection being automatically controlled by the primary controller synchronously with the operation of the throttle valve.

In testimony whereof, I affix my signature in presence of two witnesses.

MARTIN C. BRIGHT.

Witnesses:
  O. L. CHAMNESS,
  E. T. SILVIUS.